(12) United States Patent
Sheridan et al.

(10) Patent No.: US 11,536,203 B2
(45) Date of Patent: Dec. 27, 2022

(54) FLEXIBLE COUPLING FOR GEARED TURBINE ENGINE

(71) Applicant: RAYTHEON TECHNOLOGIES CORPORATION, Farmington, CT (US)

(72) Inventors: William G. Sheridan, Southington, CT (US); John R. Otto, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/480,503

(22) Filed: Sep. 21, 2021

(65) Prior Publication Data

US 2022/0003172 A1  Jan. 6, 2022

Related U.S. Application Data

(63) Continuation of application No. 17/034,713, filed on Sep. 28, 2020, now Pat. No. 11,136,920, which is a
(Continued)

(51) Int. Cl.
  *F02C 7/36* (2006.01)
  *F02C 7/06* (2006.01)
  *F02C 7/20* (2006.01)

(52) U.S. Cl.
  CPC ............... *F02C 7/36* (2013.01); *F02C 7/06* (2013.01); *F02C 7/20* (2013.01);
(Continued)

(58) Field of Classification Search
  CPC ......... F02C 7/36; F02C 7/20; F05D 2260/403
  See application file for complete search history.

(56) References Cited

U.S. PATENT DOCUMENTS

| | | |
|---|---|---|
| 2,258,792 A | 10/1941 | New |
| 2,936,655 A | 5/1960 | Peterson et al. |
| 3,021,731 A | 2/1962 | Stoeckicht |
| 3,194,487 A | 7/1965 | Tyler et al. |
| 3,287,906 A | 11/1966 | McCormick |

(Continued)

FOREIGN PATENT DOCUMENTS

| | | |
|---|---|---|
| EP | 0791383 A1 | 8/1997 |
| EP | 1142850 A1 | 10/2001 |

(Continued)

OTHER PUBLICATIONS

Pyrograf-III Carbon Nanofiber. Product guide. Retrieved Dec. 1, 2015 from: http://pyrografproducts.com/Merchant5/merchant.mvc?Screen=cp_nanofiber.

(Continued)

*Primary Examiner* — Shafiq Mian
(74) *Attorney, Agent, or Firm* — Carlson, Gaskey & Olds, P.C.

(57) ABSTRACT

A gas turbine engine includes a fan, a fan shaft coupled with the fan and arranged along an engine central axis, and a frame supporting the fan shaft. The frame defines a lateral frame stiffness (LFS). A non-rotatable flexible coupling and a rotatable flexible coupling support an epicyclic gear system. The couplings are subject to a Motion II of cantilever beam free end motion with respect to the engine central axis. The non-rotatable and the rotatable flexible couplings each have a stiffness of a common stiffness type under a common type of motion. The common stiffness type is a Stiffness B and the common type of motion is the Motion II. The Stiffness B of the rotatable flexible coupling is greater than the stiffness B of the non-rotatable flexible coupling, and a ratio of LFS/Stiffness B of the non-rotatable flexible coupling is in a range of 10-40.

19 Claims, 3 Drawing Sheets

Related U.S. Application Data continuation of application No. 16/148,239, filed on Oct. 1, 2018, now Pat. No. 10,787,971, which is a continuation of application No. 15/862,716, filed on Jan. 5, 2018, now Pat. No. 10,087,850, which is a continuation of application No. 14/766,766, filed as application No. PCT/US2014/016753 on Feb. 18, 2014, now Pat. No. 9,863,326.

(60) Provisional application No. 61/777,320, filed on Mar. 12, 2013.

(52) U.S. Cl.
CPC ............... F05D 2260/403 (2013.01); F05D 2260/40311 (2013.01); F05D 2260/96 (2013.01)

(56) References Cited

U.S. PATENT DOCUMENTS

| | | |
|---|---|---|
| 3,352,178 A | 11/1967 | Lindgren et al. |
| 3,412,560 A | 11/1968 | Gaubatz |
| 3,664,612 A | 5/1972 | Skidmore et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,584 A | 7/1995 | Amin et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,073,439 A | 6/2000 | Beaven et al. |
| 6,223,616 B1 | 5/2001 | Sheridan |
| 6,260,351 B1 | 7/2001 | Delano et al. |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,663,530 B2 | 12/2003 | Poulin et al. |
| 6,709,492 B1 | 3/2004 | Spadaccini et al. |
| 6,735,954 B2 | 5/2004 | MacFarlane et al. |
| 6,814,541 B2 | 11/2004 | Evans et al. |
| 6,855,089 B2 | 2/2005 | Poulin et al. |
| 6,883,303 B1 | 4/2005 | Seda |
| 6,895,741 B2 | 5/2005 | Rago et al. |
| 7,021,042 B2 | 4/2006 | Law |
| 7,104,918 B2 | 9/2006 | Mitrovic |
| 7,144,349 B2 | 12/2006 | Mitrovic |
| 7,219,490 B2 | 5/2007 | Dev |
| 7,223,197 B2 | 5/2007 | Poulin et al. |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,665,293 B2 | 2/2010 | Wilson, Jr. et al. |
| 7,704,178 B2 | 4/2010 | Sheridan et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,841,163 B2 | 11/2010 | Welch et al. |
| 7,841,165 B2 | 11/2010 | Orlando et al. |
| 7,926,260 B2 | 4/2011 | Sheridan et al. |
| 7,959,532 B2 | 6/2011 | Suciu et al. |
| 7,997,868 B1 | 8/2011 | Liang |
| 8,172,717 B2 | 5/2012 | Lopez et al. |
| 8,205,432 B2 | 6/2012 | Sheridan |
| 8,297,217 B2 | 10/2012 | Hsu et al. |
| 8,297,916 B1 * | 10/2012 | McCune ............... F01D 25/164 415/124.2 |
| 8,297,917 B1 | 10/2012 | McCune et al. |
| 8,814,503 B2 | 8/2014 | McCune et al. |
| 9,133,729 B1 | 9/2015 | McCune et al. |
| 9,239,012 B2 * | 1/2016 | McCune ................... F02C 7/36 |
| 9,631,558 B2 | 4/2017 | McCune et al. |
| 10,590,854 B2 * | 3/2020 | Sheridan .................. F02C 7/36 |
| 2006/0228206 A1 | 10/2006 | Decker et al. |
| 2008/0003096 A1 | 1/2008 | Kohli et al. |
| 2008/0097813 A1 | 4/2008 | Collins et al. |
| 2008/0098713 A1 | 5/2008 | Orlando et al. |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0304518 A1 | 12/2009 | Kodama et al. |
| 2009/0314881 A1 | 12/2009 | Suciu et al. |
| 2010/0013234 A1 | 1/2010 | Sloth |
| 2010/0105516 A1 | 4/2010 | Sheridan et al. |
| 2010/0148396 A1 | 6/2010 | Xie et al. |
| 2010/0150702 A1 | 6/2010 | Sheridan et al. |
| 2010/0212281 A1 | 8/2010 | Sheridan |
| 2010/0218483 A1 | 9/2010 | Smith |
| 2010/0331139 A1 | 12/2010 | McCune |
| 2011/0106510 A1 | 5/2011 | Poon |
| 2011/0159797 A1 | 6/2011 | Beltman et al. |
| 2011/0293423 A1 | 12/2011 | Bunker et al. |
| 2012/0124964 A1 | 5/2012 | Hasel et al. |
| 2013/0192196 A1 | 8/2013 | Suciu et al. |
| 2013/0259655 A1 | 10/2013 | Coffin et al. |
| 2013/0287575 A1 * | 10/2013 | McCune ................... F02K 3/06 416/170 R |
| 2013/0331223 A1 | 12/2013 | McCune et al. |
| 2013/0331224 A1 | 12/2013 | McCune et al. |
| 2013/0336791 A1 | 12/2013 | McCune et al. |
| 2014/0011623 A1 | 1/2014 | Sheridan et al. |
| 2015/0377143 A1 * | 12/2015 | Sheridan ................. F02C 7/06 415/124.1 |

FOREIGN PATENT DOCUMENTS

| | | | |
|---|---|---|---|
| EP | 1777380 | A2 | 4/2007 |
| EP | 2532841 | A2 | 12/2012 |
| EP | 2532858 | A2 | 12/2012 |
| GB | 1516041 | A | 6/1978 |
| GB | 2041090 | A | 9/1980 |
| GB | 2426792 | A | 12/2006 |
| WO | 2007038674 | A1 | 4/2007 |

OTHER PUBLICATIONS

QCSEE ball spline pitch-change mechanism whirligig test report. (1978). NASA-CR-135354. Sep. 1, 1978. pp. 1-57.

(56) References Cited

OTHER PUBLICATIONS

QCSEE hamilton standard cam/harmonic drive variable pitch fan actuation system derail design report. (1976). NASA-CR-134852 Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N., "Advanced prop-fan engine technology (APET) single- and counter-rotation gearbox/pitch change mechanism," Prepared for NASA, NASA CR-168114 (vol. II), Jul. 1985, pp. 1-175.
Riegler, C., and Bichlmaier, C. (2007). The geared turbofan technology—Opportunities, challenges and readiness status. Porceedings CEAS. Sep. 10-13, 2007. Berlin, Germany, pp. 1-12.
Rolls-Royce M45H. Jane's Aero-engines, Aero-engines—Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France, pp. 1-595.
Salemme, C.T. and Murphy, G.C. (1979). Metal spar/superhybrid shell composite fan blades. Prepared for Nasa. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592 Jun. 1, 1985. pp 1-476.
Savelle, S.A. and Garrard, G.D. (1996). Application of transient and dynamic simulations to the U.S. Army T55-L-712 helicopter engine The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-6 and 764-71.
Shah, D.M. (1992). MoSi2 and other silicides as high temperature structural materials. Superalloys 1992. The Minerals, Metals, & Materials Society, pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Singh, R. and Houser, D.R. (1990). Non-linear dynamic analysis of geared systems. NASA-CR-180495. Feb. 1, 1990. pp 1-263.
Smith, C.E., Hirschkron, R., and Warren, R.E. (1981). Propulsion system study for small transport aircraft technology (STAT) Final report. NASA-CR-165330. May 1, 1981. pp. 1-216.
Smith-Boyd, L. and Pike, J. (1986). Expansion of epicyclic gear dynamic analysis program. Prepared for NASA. NASA CR-179563 Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. For Gas Turbine and Power, vol. 123. Oct. 2001. pp 741-746.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Supplementary European Search Report for Application No. EP14774942, dated Oct. 5, 2016, 12 pages.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
Third Party Observations for EP Application No. EP14774942.8 filed Jun. 20, 2018, dated Jun. 26, 2018.

(56) References Cited

OTHER PUBLICATIONS

Thulin, R.D., Howe, D.C., and Singer, I.D. (1982). Energy efficient engine: High pressure turbine detailed design report. Prepared for NASA. NASA CR-165608. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retrieved Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D. and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
AGMA Standard (1997) Design and selection of components for enclosed gear drives, lexandria, VA: American Sear Manufacturers Association, pp. 1-48.
AGMA Standard (1999) Flexible couplings- Mass elastic properties and other characteristics. Alexandria, VA: American Gear Manufacturers Association, pp. 1-46.
AGMA Standard (2006). Design manual for enclosed epicyclic gear drives. Alexandria, VA: American Gear Manufacturers Association, pp. 1-104.
Ahmad, F. and Mizramoghadam, A.V. (1999). Single v. two stage high pressure turbine design of modem aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. ALF 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bloomer, H.E. and Loeffler, I.J. (1982). QCSEE over-the-wing engine acoustic data. NASA-TM-82708. May 1, 1982. pp. 1-558.

(56) References Cited

OTHER PUBLICATIONS

Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers,108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference, pp. 1-10.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Communication Pursuant to Article 94(3) EPC in European Patent Application No. 14774942.8.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Managerat Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades, pp. 1-18.
Davis, D.G.M. (1973). Variable-pitch fans: Progress in Britain. Flight International. Apr. 19, 1973. pp. 615-617.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Courtney H. Bailey, In re U.S. Pat. No. 8,511,605, Executed Jul. 19, 2016, pp. 1-4.
Declaration of Dr. Magdy Attia, In re U.S. Pat. No. 8,313,280, Executed Oct. 21, 2016, pp. 1-88.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . J. (2007). Aviation fuels: Techincal review. Chevron Products Company, pp. 1-94. Retrieved from: https://www.cgabusinessdesk.com/document/aviation_tech_re view.pdf.
Hendricks, E.S. and Tong, M.T. (2012). Performance and weight estimates for an advanced open rotor engine. NASA/TM-2012-217710. pp. 1-13.
Hess, C. (1998). Pratt & Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868 Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the

(56) References Cited

OTHER PUBLICATIONS

40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

International Preliminary Report on Patentability for PCT Application No. PCT/US2014/016753, dated Sep. 24, 2015, 8 pages.

International Search Report and Written Opinion for PCT Application No. PCT/US2014/016753 dated Jun. 16, 2014, 11 pages.

Ivchenko-Progress AI-727M. Jane's Aero-engines, Aero-engines—Turbofan. Nov. 27, 2011.

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148(8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press, p. 11.

Knip, Jr., G. (1987). Analysis of an advanced technology subsonic turbofan incorporating revolutionary materials. NASA Technical Memorandum. May 1987. pp. 1-23.

Kojima, Y. Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press, p. 465.

Krantz, T.L. (1990). Experimental and analytical evaluation of efficiency of helicopter planetary stage. NASA Technical Paper. Nov. 1990. pp. 1-19.

Krenkel, W., Naslain, R., and Schneider, H. Eds. (2001). High temperature ceramic matrix composites pp. 224-229. Weinheim, DE: Wiley-VCH Verlag GmbH.

Kurzke, J. (2001). GasTurb 9: A program to calculate design and off-design performance of gas turbines. Retrieved from: https://www.scribd.com/document/92384867/GasTurb9Manual.

Kurzke, J. (2012). GasTurb 12: Design and off-design performance of gas turbines. Retrieved from: https://www.scribd.com/document/153900429/GasTurb-12.

Kurzke, J. (2008). Preliminary Design, Aero-engine design: From state of the art turbofans towards innovative architectures, pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Declaration of Dr. Magdy Attia, In re U.S. Pat. No. 8,517,668, Executed Dec. 8, 2016, pp. 1-81.

Declaration of John Eaton, Ph.D. In re U.S. Pat. No. 8,869,568, Executed Mar. 28, 2016, pp. 1-87.

Declaration of Raymond Drago., In re U.S. Pat. No. 8,297,916, IPR2018-01172, Executed May 29, 2018, pp. 1-115.

Declaration of Reza Abhari, In re U.S. Pat. No. 8,448,895, Executed Nov. 28, 2016, pp. 1-81.

Declaration of Reza Abhari. In re U.S. Pat. No. 8,695,920, claims 1-4, 7-14, 17 and 19, Executed Nov. 29, 2016, pp. 1-102.

Declaration of Reza Abhari. In re U.S. Pat. No. 8,695,920. Executed Nov. 30, 2016, pp. 1-67.

Declaration of Reza Abhari, Ph.D. In re U.S. Pat. No. 8,844,265, Executed Jun. 28, 2016, pp. 1-91.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Dickey, T.A. and Dobak, E.R. (1972). The evolution and development status of ALF 502 turbofan engine. National Aerospace Engineering and Manufacturing Meeting San Diego, California. Oct. 2-5, 1972. pp. 1-12.

Drago, R.J. (1974). Heavy-lift helicopter brings up drive ideas. Power Transmission Design. Mar. 1987. pp. 1-15.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Dudley, D.W., Ed. (1954). Handbook of practical gear design. Lancaster, PA: Technomic Publishing Company, Inc. pp. 3.96-102 and 8.12-18.

Dudley, D.W., Ed. (1962). Gear handbook. New York, NY: McGraw-Hill. pp. 14-17 (TOC, Preface, and Index).

Dudley, D.W., Ed. (1962). Gear handbook. New York, NY: McGraw-Hill. pp. 3.14-18 and 12.7-12.21.

Dudley, D.W., Ed. (1994). Practical gear design. New York, NY: McGraw-Hill. pp. 119-124.

Edkins, D.P., Hirschkron, R., and Lee, R. (1972). TF34 turbofan quiet engine study. Final Report prepared for NASA. NASA-CR-120914. Jan. 1, 1972. pp. 1-99.

Edwards, T. and Zabarnick, S. (1993). Supercritical fuel deposition mechanisms. Ind. Eng. Chem. Res. vol. 32. 1993. pp. 3117-3122.

El-Sayad, A.F. (2008). Aircraft propulsion and gas turbine engines. Boca Raton, FL: CRC Press. pp. 215-219 and 855-60.

English Translation of Measurement and Calculation Methodology on TFE731-2, TFE731-3A and TFE731-3D Models, 14 pages.

European Search Report for European Patent Application No. 21169446.8 completed Jul. 23, 2021.

Faghri, A. (1995). Heat pipe and science technology. Washington, D.C.: Taylor & Francis. pp. 1-60.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

File History for U.S. Appl. No. 12/131,876.

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Frankenfeld, J.W. and Taylor, W.F. (1980). Deposit fromation from deoxygenated hydrocarbons. 4. Studies in pure compound systems Ind. Eng. Chem., Prod. Res. Dev., vol. 19(1). 1978. pp. 65-70.

(56) References Cited

OTHER PUBLICATIONS

Garret TFE731 Turbofan Engine (CAT C). Chapter 79: Lubrciation System. TTFE731 Issue 2. 2010. pp. 1-24.

Sates, D. Bombardier flies at higher market. Seattle Times. Jul. 13, 2008. pp. C6.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Gliebe, P.R., Ho, P.Y., and Mani, R. (1995). UHB engine fan and broadband noise reduction study. NASA CR-198357. Jun. 1995. pp. 1-48.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Gray, D.E. (1978). Energy efficient engine preliminary design and integration studies. NASA-CP-2036-PT-1. Nov. 1978. pp. 89-110.

Gray, D.E. (1978). Energy efficient engine preliminary design and integration studies. Prepared for NASA. NASA CR-135396. Nov. 1978. pp. 1-366.

Gray, D.E. and Gardner, W.B. (1983). Energy efficient engine program technology benefit/cost study—vol. 2. NASA CR-174766. Oct. 1983. pp. 1-118.

Sreitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.

Griffiths, B. (2005). Composite fan blade containment case. Modern Machine Shop. Retrieved from: http://www.mmsonline.com/articles/composite-fan-blade-containment-case pp. 1-4.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise-CON 94. Fort Lauderdale, FL. May 1-4, 1994. pp. 1-10.

Gunston, B. (Ed.) (2000). Jane's aero-engines, Issue seven. Coulsdon, Surrey, UK: Jane's Information Group Limited, pp. 510-512.

Guynn, M. D., Berton, J.J., Fisher, K. L., Haller, W.J., Tong, M. T. and Thurman, D.R. (2011). Refined exploration of turbofan design options for an advanced single-aisle transport. NASA/TM-2011-216883. pp. 1-27.

Guynn, M.D., et al., "Analysis of turbofan design options for an advanced single-aisle transport aircraft", American Institute of Aeronautics and Astronautics, 2009, pp. 1-13.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Haldenbrand, R. and Norgren, W.M. (1979). Airesearch QCGAT program [quiet clean general aviation turbofan engines]. NASA-CR-159758. pp. 1-199.

Hall, C.A. and Crichton, D. (2007). Engine design studies for a silent aircraft. Journal of Turbomachinery, 129, 479-487.

Han, J., Dutta, S., and Ekkad, S.V. (2000). Gas turbine heat transfer and cooling technology. New York, NY: Taylor & Francis. pp. 1-25, 129-157, and 160-249.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Hazlett, R.N. (1991). Thermal oxidation stability of aviation turbine fuels. Philadelphia, PA: ASTM. pp. 1-163.

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Lau, K., Gu, C., and Hui, D. (2005). A critical review on nanotube and nanotube/nanoclay related polymer composite materials Composites: Part B 37(2006) 425-436.

Leckie, F.A. and Dal Bello, D.J. (2009). Strength and stiffness of engineering systems. Mechanical Engineering Series. Springer. pp. 1-10, 48-51.

Leckie F.A., et al., "Strength and Stiffness of Engineering Systems," Mechanical Engineering Series, Springer, 2009, pp. 1-3.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. vol. 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018 pp. 1-403.

Lord, W.K., Macmartin, D.G., and Tillman, T.G. (2000). Flow control opportunities in gas turbine engines. American Institute of Aeronautics and Astronautics, pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turbofan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp 1-76.

(56) References Cited

OTHER PUBLICATIONS

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.

Meier N., "Civil Turbojet/Turbofan Specifications", 2005, retrieved from http://jet-engine.net/civtfspec.html, 8 pages.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Norton, M. and Karczub, D. (2003). Fundamentals of noise and vibration analysis for engineers. Press Syndicate of the University of Cambridge. New York: New York. p. 524.

Notice of Opposition for European Patent No. 2949882 (15175205.2) dated May 23, 2018 by Safran Aircraft Engines.

Notice of Opposition of European Patent No. 2811120 (14155460.0), dated Apr. 12, 2018 by Rolls-Royce, 74 pages.

Notice of Opposition to Patent No. EP2811120 (14155460.0) by Safran Aircraft Engines dated Apr. 12, 2018. [with English translation].

Oates, G.C. (Ed). (1989). Aircraft propulsion systems and technology and design. Washington, D.C.: American Institute of Aeronautics, Inc. pp. 341-344.

Parametric study of STOL short-haul transport engine cycles and operational techniques to minimize community noise impact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Petition for Inter Partes Review of U.S. Pat. No. 8,297,916, *General Electric Company*, Petitioner, v. *United Technologies Corporation*, Patent Owner, IPR2018-01171, May 30, 2018.

Petition for Inter Partes Review of U.S. Pat. No. 8,297,916, *General Electric Company*, Petitioner v, *United Technologies Corporation*, Patent Owner: IPR2018-01172, filed May 30, 2018, 83 pages.

Petrovic, J.J., Castro, R.G., Vaidya, R.U., Peters, M.L, Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

\* cited by examiner

FLEXIBLE COUPLING FOR GEARED TURBINE ENGINE

CROSS REFERENCE TO RELATED APPLICATIONS

The present disclosure is a continuation of U.S. patent application Ser. No. 17/034,713 filed Sep. 28, 2020, which is continuation of U.S. patent application Ser. No. 16/148,239, filed Oct. 1, 2018, which is a continuation of U.S. patent application Ser. No. 15/862,716, filed Jan. 5, 2018, which is a continuation of U.S. patent application Ser. No. 14/766,766, filed Aug. 10, 2015, now U.S. Pat. No. 9,863,326 granted Jan. 9, 2018, which is a national application of International Application No. PCT/US2014/016753, filed Feb. 18, 2014, which claims benefit of U.S. Provisional Application No. 61/777,320 filed Mar. 12, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section typically includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section. In such engine architectures, a shaft driven by one of the turbine sections provides an input to the epicyclical gear assembly that drives the fan section at a reduced speed. During flight, a geared engine can be subject to aero and maneuver loads that cause significant engine deflections. The loads can cause different types of deflection motions, as will be described in more detail below, between a gear system and static portions of the engine such that the gear system can have the tendency to misalign with respect to the engine central axis. Misalignment of the gear system can cause efficiency losses in the meshing between gear teeth in the gear system and reduced life from increases in concentrated stresses.

SUMMARY

A gas turbine engine according to an example of the present disclosure includes a fan, a fan shaft coupled with the fan and arranged along an engine central axis, and a frame supporting the fan shaft. The frame defines a lateral frame stiffness (LFS). An epicyclic gear system is coupled to the fan shaft, and a non-rotatable flexible coupling and a rotatable flexible coupling support the epicyclic gear system. The non-rotatable flexible coupling and the rotatable flexible coupling are subject to a Motion II of cantilever beam free end motion with respect to the engine central axis. The non-rotatable flexible coupling and the rotatable flexible coupling each have a stiffness of a common stiffness type under a common type of motion with respect to the engine central axis. The common stiffness is defined with respect to the LFS. The common stiffness type is a Stiffness B and the common type of motion is the Motion II. The Stiffness B of the rotatable flexible coupling is greater than the stiffness of the non-rotatable flexible coupling, and a ratio of LFS/Stiffness B of the non-rotatable flexible coupling is in a range of 10-40.

In a further embodiment of any of the foregoing embodiments, a ratio LFS/Stiffness B of the rotatable flexible coupling is in a range of 33-1000.

In a further embodiment of any of the foregoing embodiments, the common type of motion is selected from Motion I, Motion III, or Motion IV, where Motion I is parallel offset guided end motion, Motion III is angular misalignment no offset motion, and Motion IV is axial motion.

In a further embodiment of any of the foregoing embodiments, the epicyclic gear system includes a sun gear in meshed engagement with multiple intermediate gears that are rotatably mounted on bearings in a rotatable carrier. Each intermediate gear is in meshed engagement with a non-rotatable ring gear. The sun gear is rotatably coupled to the fan shaft, and the first, non-rotatable flexible coupling is coupled with the non-rotatable ring gear.

In a further embodiment of any of the foregoing embodiments, the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

In a further embodiment of any of the foregoing embodiments, the common stiffness type is Stiffness C under Motion I, and a ratio of LFS/Stiffness C of the non-rotatable flexible coupling is in a range of 1.5-7, and a ratio LFS/Stiffness C of the rotatable flexible coupling is in a range of 16-100.

In a further embodiment of any of the foregoing embodiments, the common stiffness type is Stiffness D under Motion I, and a ratio of LFS/Stiffness D of the non-rotatable flexible coupling is in a range of 0.25-0.5, and a ratio LFS/Stiffness D of the rotatable flexible coupling is in a range of 2-100.

In a further embodiment of any of the foregoing embodiments, the common stiffness type is Stiffness E under Motion III, and a ratio of LFS/Stiffness E of the non-rotatable flexible coupling is in a range of 6-40, and a ratio LFS/Stiffness E of the rotatable flexible coupling is in a range of 4-500.

In a further embodiment of any of the foregoing embodiments, the epicyclic gear system is coupled through an input shaft to a low pressure turbine, the low pressure turbine having a pressure ratio of greater than 5.s A gas turbine engine according to an example of the present disclosure includes a fan, a fan shaft coupled with the fan and arranged along an engine central axis, and a frame supporting the fan shaft. The frame defines a lateral frame stiffness (LFS). An epicyclic gear system is coupled to the fan shaft, and a non-rotatable flexible coupling and a rotatable flexible coupling support the epicyclic gear system. The non-rotatable flexible coupling and the rotatable flexible coupling are subject to a Motion I of parallel offset guided end motion with respect to the engine central axis. The non-rotatable flexible coupling and the rotatable flexible coupling each have a stiffness of a common stiffness type under a common type of motion with respect to the engine central axis. The stiffness is defined with respect to the LFS, the common stiffness type is a Stiffness C and the common type of motion is the Motion I. The Stiffness C of the rotatable flexible coupling is greater than the stiffness of the non-rotatable flexible coupling, and a ratio of LFS/Stiffness C of the non-rotatable flexible coupling is in a range of 1.5-7.

In a further embodiment of any of the foregoing embodiments, a ratio LFS/Stiffness C of the rotatable flexible coupling is in a range of 16-100.

In a further embodiment of any of the foregoing embodiments, the common type of motion is selected from Motion I, Motion III, or Motion IV, where Motion I is parallel offset guided end motion, Motion III is angular misalignment no offset motion, and Motion IV is axial motion, and wherein the epicyclic gear system includes a sun gear in meshed engagement with multiple intermediate gears that are rotatably mounted on bearings in a rotatable carrier. Each intermediate gear is in meshed engagement with a non-rotatable ring gear. The sun gear is rotatably coupled to the fan shaft, and the first, non-rotatable flexible coupling is coupled with the non-rotatable ring gear.

In a further embodiment of any of the foregoing embodiments, the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

In a further embodiment of any of the foregoing embodiments, the common stiffness type is Stiffness D under Motion I, and a ratio of LFS/Stiffness D of the non-rotatable flexible coupling is in a range of 0.25-0.5, and a ratio LFS/Stiffness D of the rotatable flexible coupling is in a range of 2-100.

In a further embodiment of any of the foregoing embodiments, the common stiffness type is Stiffness E under Motion III, and a ratio of LFS/Stiffness E of the non-rotatable flexible coupling is in a range of 6-40, and a ratio LFS/Stiffness E of the rotatable flexible coupling is in a range of 4-500.

A gas turbine engine according to an example of the present disclosure includes a fan, a fan shaft coupled with the fan and arranged along an engine central axis, and a frame supporting the fan shaft. The frame defines a lateral frame stiffness (LFS). An epicyclic gear system is coupled to the fan shaft, and a non-rotatable flexible coupling and a rotatable flexible coupling support the epicyclic gear system. The non-rotatable flexible coupling and the rotatable flexible coupling are subject to a Motion III of angular misalignment no offset motion with respect to the engine central axis. The non-rotatable flexible coupling and the rotatable flexible coupling each have a stiffness of a common stiffness type under a common type of motion with respect to the engine central axis. The stiffness is defined with respect to the LFS. The common stiffness type is a Stiffness E and the common type of motion is the Motion III. The Stiffness E is defined with respect to the LFS, the Stiffness E of the rotatable flexible coupling are greater than the stiffness of the non-rotatable flexible coupling, and a ratio of LFS/Stiffness E of the non-rotatable flexible coupling is in a range of 6-40.

In a further embodiment of any of the foregoing embodiments, a ratio of LFS/Stiffness E of the rotatable flexible coupling is in a range of 4-500.

In a further embodiment of any of the foregoing embodiments, the common type of motion is selected from Motion I, Motion III, or Motion IV, where Motion I is parallel offset guided end motion, Motion III is angular misalignment no offset motion, and Motion IV is axial motion, and wherein the epicyclic gear system includes a sun gear in meshed engagement with multiple intermediate gears that are rotatably mounted on bearings in a rotatable carrier. Each intermediate gear is in meshed engagement with a non-rotatable ring gear. The sun gear is rotatably coupled to the fan shaft, and the first, non-rotatable flexible coupling is coupled with the non-rotatable ring gear.

In a further embodiment of any of the foregoing embodiments, the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
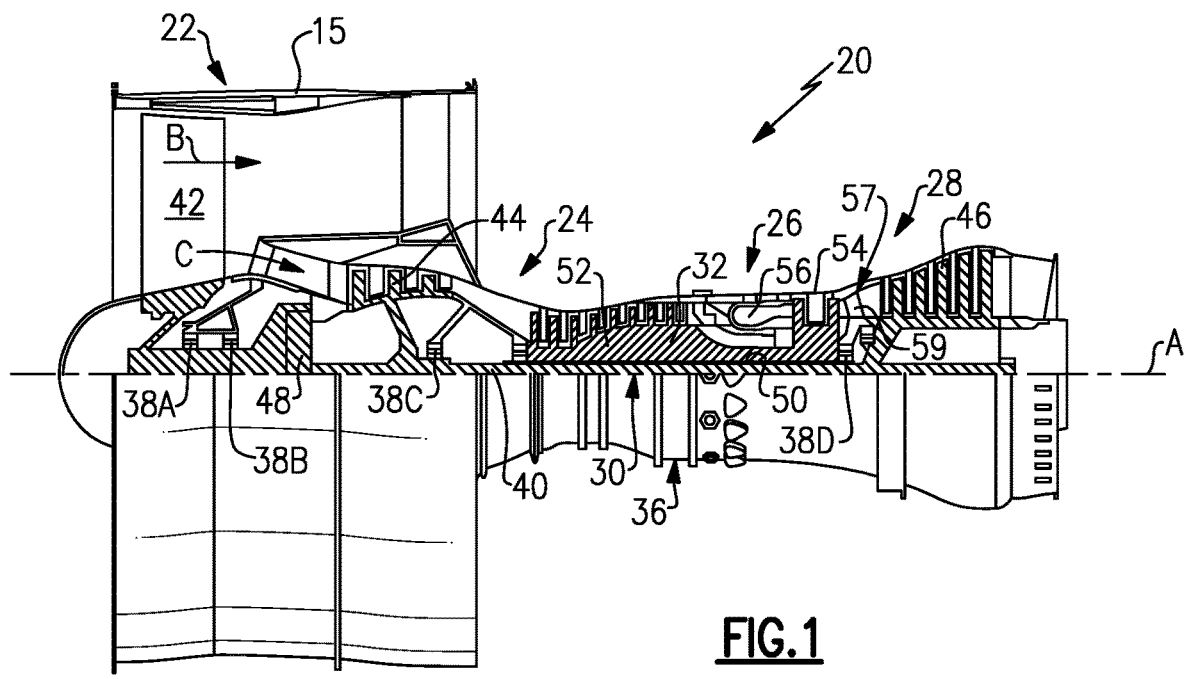
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines, including three-spool architectures.

The engine 20 includes a low speed spool 30 and a high speed spool 32 mounted for rotation about an engine central axis A relative to an engine static structure 36 via several bearing systems, shown at 38, 38B, 38C and 38D. It is to be understood that various bearing systems at various locations may alternatively or additionally be provided, and the location of bearing systems may be varied as appropriate to the application.

The low speed spool 30 includes an inner shaft 40 that interconnects a fan 42, a low pressure compressor 44 and a low pressure turbine 46. The inner shaft 40 is connected to the fan 42 through a speed change mechanism, which in this example is a gear system 48, to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing 38D in the turbine section 28. The inner shaft 40 and the outer shaft 50 are concentric and rotate via, for example, bearing systems 38C and 38D about the engine central axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3 and the low pressure turbine 46 has a pressure ratio that is greater than about five. In one disclosed embodiment, the bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

As described below, the gear system 48 in the engine 20 is mounted on flexible couplings 74 (FIG. 2) to reduce loads on the gear system 48 due to misalignment with respect to the engine central axis A. As a result, the embodiments hereafter described resolve the aforementioned issues associated with respect to misalignment in the gear system that would otherwise result in efficiency losses in the gear teeth in the gear system and reduced life from increases in concentrated stresses.

Figure 2:
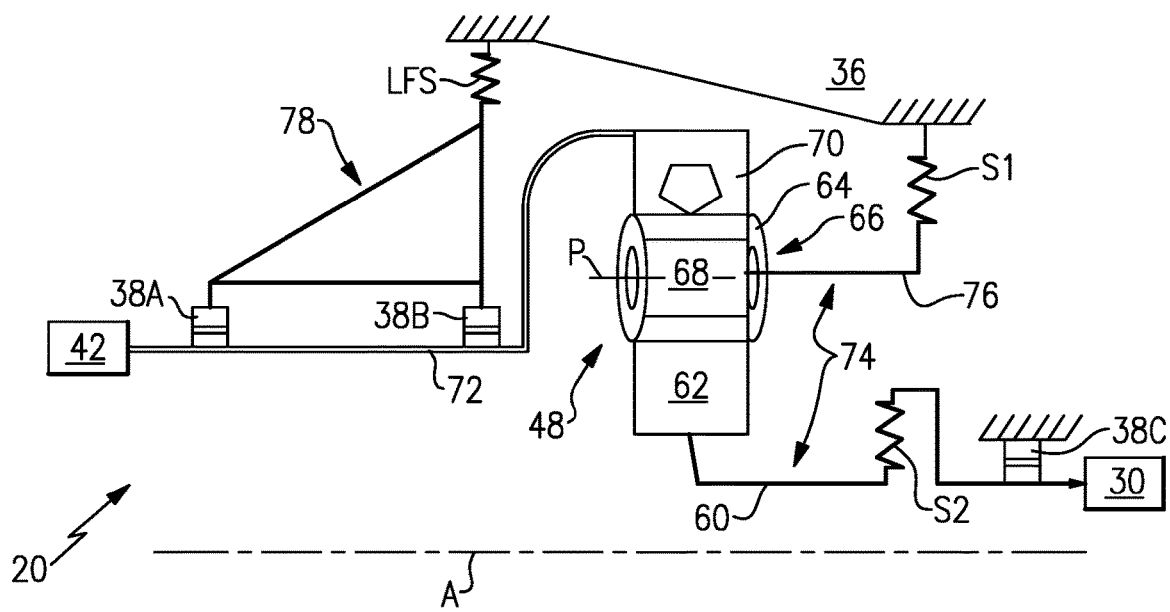
FIG. 2 illustrates selected portions of the engine of FIG. 1.
Figure 3:
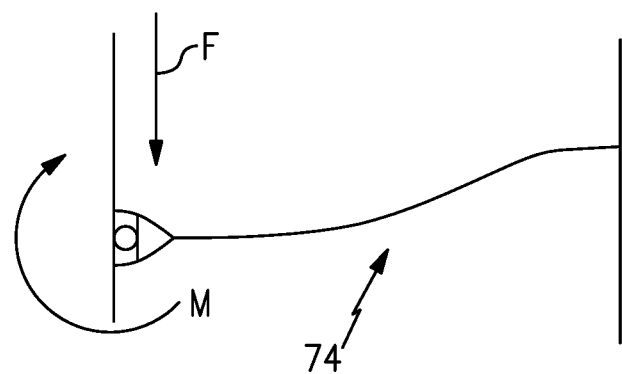
FIG. 3 schematically illustrates parallel offset guided end motion of a flexible coupling in the engine of FIG. 1.
Figure 4:
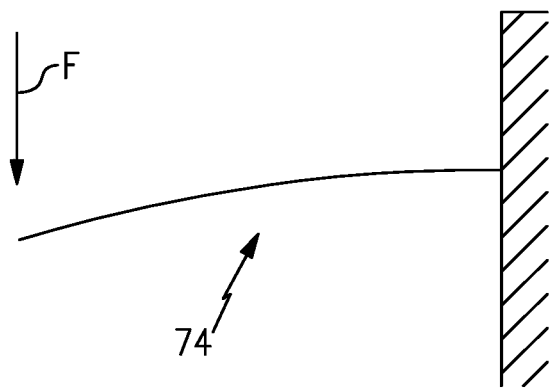
FIG. 4 schematically illustrates cantilever beam free end motion of a flexible coupling in the engine of FIG. 1.
Figure 5:
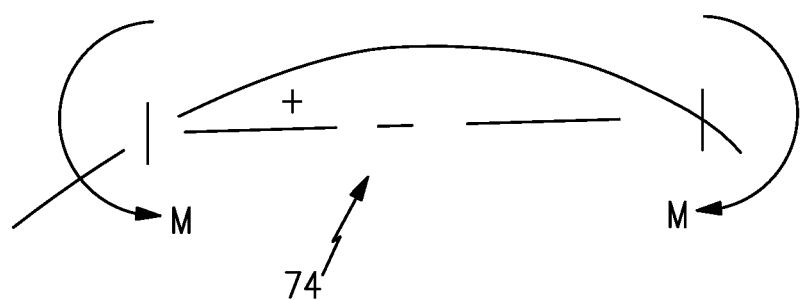
FIG. 5 schematically illustrates angular misalignment no offset motion of a flexible coupling in the engine of FIG. 1.
Figure 6:
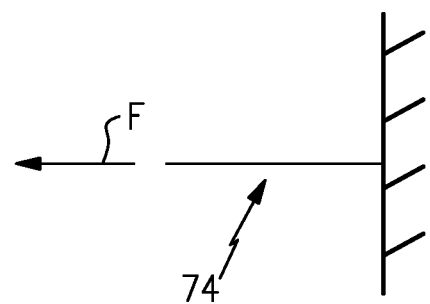
FIG. 6 schematically illustrates axial motion of a flexible coupling in the engine of FIG. 1.

FIG. 2 schematically shows a portion of the engine 20 around the gear system 48. The gear system 48 is driven by the low speed spool 30 through an input shaft 60. The input shaft 60 transfers torque to the gear system 48 from the low speed spool 30. In this example, the input shaft 60 is coupled to a sun gear 62 of the gear system 48. The sun gear 62 is in meshed engagement with multiple intermediate gears 64, of which the illustrated intermediate gear 64 is representative. Each intermediate gear 64 is rotatably mounted in a carrier 66 by a respective rolling bearing 68, such as a journal bearing. Rotary motion of the sun gear 62 urges each intermediate gear 64 to rotate about a respective longitudinal axis P.

Each intermediate gear 64 is also in meshed engagement with a ring gear 70 that is rotatably coupled to a fan shaft 72 in this example. Since the intermediate gears 64 mesh with the rotating ring gear 70 and the rotating sun gear 62, the intermediate gears 64 rotate about their own axes to drive the ring gear 70 to rotate about engine central axis A. The rotation of the ring gear 70 is conveyed to the fan 42 through the fan shaft 72 to thereby drive the fan 42 at a lower speed than the low speed spool 30. In this example, the carrier 66 is fixed (non-rotating) and the ring gear 70 is rotatable such that the intermediate gears 64 serve as star gears. In any of the examples herein, the carrier 66 can alternatively be rotatable and the ring gear 70 can be fixed (non-rotating) such that the intermediate gears 64 serve as planet gears and the carrier is coupled to rotatably drive the fan shaft 72 and the fan 42. Thus, the flexible support 76 described herein can be coupled either to the fixed carrier (star system) or to the fixed ring gear (planetary system), depending upon the configuration of the gear system 48.

The gear system 48 is at least partially supported by flexible couplings 74. In FIG. 2, the flexible couplings 74 include a first flexible coupling, which is flexible support 76 that is coupled with the carrier 66 and a second flexible coupling, which is the input shaft 60 that supports the gear system 48 with respect to bearing system 38C. The flexible support 76 is static (fixed, non-rotating) and supports the gear system 48 with respect to the static structure 36.

The static structure 36 includes a bearing support static structure 78, which can also be termed a "K-frame." In this example, the bearing support static structure 78 is the support structure forward of the gear system 48 that supports the bearings 38A and 38B and the fan shaft 72. The bearing support static structure 78 defines a lateral frame stiffness, represented as "LFS" in FIG. 2. The lateral frame stiffness LFS serves as a reference stiffness from which the different types of stiffnesses, described below, of the flexible couplings 74 are defined. The term "lateral" or variations thereof as used herein refers to a perpendicular direction with respect to the engine central axis A. It is further to be understood that "stiffness" as used herein can alternatively be termed "spring rate." The stiffnesses, or spring rates, are in units of pounds per inch, although conversions can be used to represent the units of pounds per inch in other units.

The flexible couplings 74 each have one or more specific stiffnesses A, B, C, D and E, generally represented in FIG.

2 at S1 and S2. Each of the specific stiffnesses A, B, C, D and E are defined with respect to the lateral frame stiffness LFS and a different type of motion that the flexible couplings 74 can be subject to with respect to the engine central axis A. For example, as summarized in Table 1 below, the types of motion include Motion I, Motion II, Motion III, Motion IV, or combinations thereof, where Motion I is parallel offset guided end motion, Motion II is cantilever beam free end motion and Motion III is angular misalignment no offset motion and Motion IV is axial motion. Stiffness A is axial stiffness under Motion IV, Stiffness B is radial stiffness under Motion II, Stiffness C is radial stiffness under Motion I, Stiffness D is torsional stiffness under Motion I, and Stiffness E is angular stiffness under Motion III. Terms such as "radial," "axial," "forward" and the like are relative to the engine central axis A.

Figure 7:
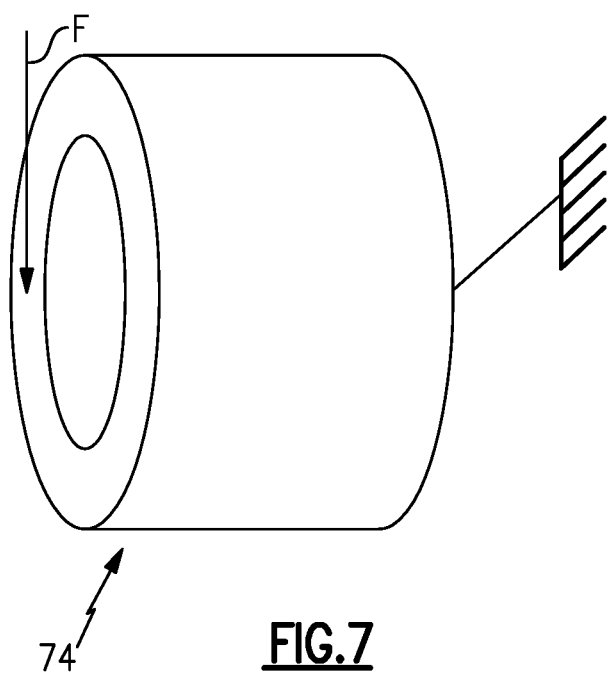
FIG. 7 schematically illustrates torsional motion of a flexible coupling in the engine of FIG. 1.

Motion I, Motion II, Motion III, Motion IV are schematically shown in force coupling diagrams in, respectively, FIG. 3, FIG. 4, FIG. 5 and FIG. 6, where F represents an applied load or force and M represents a resulting moment of force. An applied force can also result in torsional motion, as represented in FIG. 7, as well as lateral motion. The term "torsion" or variations thereof as used herein refers to a twisting motion with respect to the engine central axis A. In this regard, one or both of the flexible couplings 74 also has a torsional stiffness TS and a lateral stiffness LS defined with respect to the lateral frame stiffness LFS.

TABLE 1

Types of Motion

| Type of Motion | Description |
|---|---|
| I | parallel offset guided end motion |
| II | cantilever beam free end motion |
| III | angular misalignment no offset motion |
| IV | axial motion |

In one example, the torsional stiffness TS and the lateral stiffness LS of one or both of the flexible couplings 74 are selected in accordance with one another to reduce loads on the gear system 48 from misalignment of the gear system 48 with respect to the engine central axis A. That is, the torsional stiffness TS and the lateral stiffness LS of the flexible support 76 can be selected in accordance with one another, and the torsional stiffness TS and the lateral stiffness LS of the input shaft 60 can be selected in accordance with one another.

For example, a ratio of TS/LS is greater than or equal to about 2 for the flexible support 76, the input shaft 60 or both individually. The ratio of greater than or equal to about 2 provides the flexible couplings 74 with a high torsional stiffness relative to lateral stiffness such that the flexible coupling 74 is permitted to deflect or float laterally with relatively little torsional wind-up. The nomenclature of a ratio represented as value 1/value 2 represents value 1 divided by value 2, although the ratios herein can also be equivalently represented by other nomenclatures. As an example, the ratio can also be equivalently represented as 2:1 or 2/1. The stiffnesses herein may be provided in units of pounds per inch, although the ratios herein would be equivalent for other units.

The stiffnesses A, B, C, D, E, TS and LS can also be utilized individually or in any combination to facilitate the segregation of the gear system 48 from vibrations and other transients to reduce loads on the gear system 48 from misalignment of the gear system 48 with respect to the engine central axis A. The following examples, further illustrate selected stiffnesses A, B, C, D, E defined with respect to the frame lateral stiffness LFS.

In one example, a ratio of LFS/Stiffness A of the flexible support 76 is in a range of 6-25, and a ratio of LFS/Stiffness A of the input shaft 60 is in a range of 28-200.

In another example, a ratio of LFS/Stiffness B of flexible support 76 is in a range of 10-40, and a ratio LFS/Stiffness B of the input shaft 60 is in a range of 33-1000.

In another example, a ratio of LFS/Stiffness C of the flexible support 76 is in a range of 1.5-7, and a ratio LFS/Stiffness C of the input shaft 60 is in a range of 16-100.

In another example, a ratio of LFS/Stiffness D of the flexible support 76 is in a range of 0.25-0.5, and a ratio LFS/Stiffness D of the input shaft 60 is in a range of 2-100.

In another example, a ratio of LFS/Stiffness E of the flexible support 76 is in a range of 6-40, and a ratio LFS/Stiffness E of the input shaft 60 is in a range of 4-500.

In another example, one or more of Stiffness A, Stiffness B, Stiffness C and Stiffness D of the flexible support 76 is greater than, respectively, Stiffness A, Stiffness B, Stiffness C and Stiffness D of the input shaft 60.

In a further example, the flexible support 76 and the input shaft 60 have any combination of some or all of the above-described ratios. The ratios are summarized in Table 2 below.

TABLE 2

Ratio Ranges for First and Second Couplings

| | | Ratio FLS/Stiffness | |
|---|---|---|---|
| Type of Stiffness | Type of Motion | flexible support 76 | input shaft 60 |
| A | IV | 6-25 | 28-200 |
| B | II | 10-40 | 33-1000 |
| C | I | 1.5-7 | 16-100 |
| D | I | 0.25-0.5 | 2-100 |
| E | III | 6-40 | 4-500 |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A gas turbine engine comprising:
a fan;
a fan shaft coupled with the fan and arranged along an engine central axis;
a frame supporting the fan shaft, the frame defining a lateral frame stiffness (LFS);
an epicyclic gear system coupled to the fan shaft; and
a non-rotatable flexible coupling and a rotatable flexible coupling supporting the epicyclic gear system, the non-rotatable flexible coupling and the rotatable flex- ible coupling being subject to a Motion II of cantilever beam free end motion with respect to the engine central axis, the non-rotatable flexible coupling and the rotatable flexible coupling each having a stiffness of a common stiffness type under a common type of motion with respect to the engine central axis, the common stiffness being defined with respect to the LFS, the common stiffness type is a Stiffness B and the common type of motion is the Motion II, the Stiffness B of the rotatable flexible coupling being greater than the stiffness of the non-rotatable flexible coupling, and a ratio of LFS/Stiffness B of the non-rotatable flexible coupling is in a range of 10-40.

2. The gas turbine engine as recited in claim 1, wherein a ratio LFS/Stiffness B of the rotatable flexible coupling is in a range of 33-1000.

3. The gas turbine engine as recited in claim 2, wherein the common type of motion is selected from Motion I, Motion III, or Motion IV, where Motion I is parallel offset guided end motion, Motion III is angular misalignment no offset motion, and Motion IV is axial motion.

4. The gas turbine engine as recited in claim 3, wherein the epicyclic gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first, non-rotatable flexible coupling is coupled with the non-rotatable ring gear.

5. The gas turbine engine as recited in claim 4, wherein the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

6. The gas turbine engine as recited in claim 5, wherein the common stiffness type is Stiffness C under Motion I, and a ratio of LFS/Stiffness C of the non-rotatable flexible coupling is in a range of 1.5-7, and a ratio LFS/Stiffness C of the rotatable flexible coupling is in a range of 16-100.

7. The gas turbine engine as recited in claim 6, wherein the common stiffness type is Stiffness D under Motion I, and a ratio of LFS/Stiffness D of the non-rotatable flexible coupling is in a range of 0.25-0.5, and a ratio LFS/Stiffness D of the rotatable flexible coupling is in a range of 2-100.

8. The gas turbine engine as recited in claim 7, wherein the common stiffness type is Stiffness E under Motion III, and a ratio of LFS/Stiffness E of the non-rotatable flexible coupling is in a range of 6-40, and a ratio LFS/Stiffness E of the rotatable flexible coupling is in a range of 4-500.

9. The gas turbine engine as recited in claim 8, wherein the epicyclic gear system is coupled through an input shaft to a low pressure turbine, the low pressure turbine having a pressure ratio of greater than 5.

10. A gas turbine engine comprising:
a fan;
a fan shaft coupled with the fan and arranged along an engine central axis;
a frame supporting the fan shaft, the frame defining a lateral frame stiffness (LFS);
an epicyclic gear system coupled to the fan shaft; and
a non-rotatable flexible coupling and a rotatable flexible coupling supporting the epicyclic gear system, the non-rotatable flexible coupling and the rotatable flexible coupling being subject to a Motion I of parallel offset guided end motion with respect to the engine central axis, the non-rotatable flexible coupling and the rotatable flexible coupling each having a stiffness of a common stiffness type under a common type of motion with respect to the engine central axis, the stiffness being defined with respect to the LFS, the common stiffness type is a Stiffness C and the common type of motion is the Motion I, the Stiffness C of the rotatable flexible coupling being greater than the stiffness of the non-rotatable flexible coupling, and a ratio of LFS/Stiffness C of the non-rotatable flexible coupling is in a range of 1.5-7.

11. The gas turbine engine as recited in claim 10, wherein a ratio LFS/Stiffness C of the rotatable flexible coupling is in a range of 16-100.

12. The gas turbine engine as recited in claim 10, wherein the common type of motion is selected from Motion I, Motion III, or Motion IV, where Motion I is parallel offset guided end motion, Motion III is angular misalignment no offset motion, and Motion IV is axial motion, and wherein the epicyclic gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first, non-rotatable flexible coupling is coupled with the non-rotatable ring gear.

13. The gas turbine engine as recited in claim 12, wherein the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

14. The gas turbine engine as recited in claim 12, wherein the common stiffness type is Stiffness D under Motion I, and a ratio of LFS/Stiffness D of the non-rotatable flexible coupling is in a range of 0.25-0.5, and a ratio LFS/Stiffness D of the rotatable flexible coupling is in a range of 2-100.

15. The gas turbine engine as recited in claim 12, wherein the common stiffness type is Stiffness E under Motion III, and a ratio of LFS/Stiffness E of the non-rotatable flexible coupling is in a range of 6-40, and a ratio LFS/Stiffness E of the rotatable flexible coupling is in a range of 4-500.

16. A gas turbine engine comprising:
a fan;
a fan shaft coupled with the fan and arranged along an engine central axis;
a frame supporting the fan shaft, the frame defining a lateral frame stiffness (LFS);
an epicyclic gear system coupled to the fan shaft; and
a non-rotatable flexible coupling and a rotatable flexible coupling supporting the epicyclic gear system, the non-rotatable flexible coupling and the rotatable flexible coupling being subject to a Motion III of angular misalignment no offset motion with respect to the engine central axis, the non-rotatable flexible coupling and the rotatable flexible coupling each having a stiffness of a common stiffness type under a common type of motion with respect to the engine central axis, the stiffness being defined with respect to the LFS, the common stiffness type is a Stiffness E and the common type of motion is the Motion III, the Stiffness E being defined with respect to the LFS, the Stiffness E of the rotatable flexible coupling being greater than the stiffness of the non-rotatable flexible coupling, and a ratio of LFS/Stiffness E of the non-rotatable flexible coupling is in a range of 6-40.

17. The gas turbine engine as recited in claim 16, wherein a ratio of LFS/Stiffness E of the rotatable flexible coupling is in a range of 4-500.

18. The gas turbine engine as recited in claim 16, wherein the common type of motion is selected from Motion I, Motion III, or Motion IV, where Motion I is parallel offset guided end motion, Motion III is angular misalignment no offset motion, and Motion IV is axial motion, and wherein the epicyclic gear system includes a sun gear in meshed engagement with multiple intermediate gears that are rotatably mounted on bearings in a rotatable carrier, each intermediate gear is in meshed engagement with a non-rotatable ring gear, the sun gear is rotatably coupled to the fan shaft, and the first, non-rotatable flexible coupling is coupled with the non-rotatable ring gear.

19. The gas turbine engine as recited in claim 18, wherein the common stiffness type is Stiffness A under Motion IV, and a ratio of LFS/Stiffness A of the non-rotatable flexible coupling is in a range of 6-25, and a ratio of LFS/Stiffness A of the rotatable flexible coupling is in a range of 28-200.

\* \* \* \* \*